United States Patent
Leachman

(10) Patent No.: US 9,340,279 B2
(45) Date of Patent: May 17, 2016

(54) FLUID TRANSFER CHAMBER FOR AIRCRAFT FLUID TRANSMISSION LINES

(71) Applicant: Bell Helicopter Textron Inc., Fort Worth, TX (US)

(72) Inventor: Joseph Leachman, Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 204 days.

(21) Appl. No.: 14/267,160

(22) Filed: May 1, 2014

(65) Prior Publication Data
US 2015/0314858 A1 Nov. 5, 2015

(51) Int. Cl.
*B64D 37/02* (2006.01)
*B64C 17/10* (2006.01)
*B64D 37/00* (2006.01)

(52) U.S. Cl.
CPC ............... *B64C 17/10* (2013.01); *B64D 37/00* (2013.01); *Y10T 137/6906* (2015.04)

(58) Field of Classification Search
CPC ........ B64C 17/10; B64D 37/00; B64D 39/00; B64D 37/02; B64D 37/04; B64D 37/12; B64D 37/06; B64D 37/08; Y10T 137/6906
USPC .................. 244/135 R, 135 C; 137/899.2
See application file for complete search history.

(56) References Cited

U.S. PATENT DOCUMENTS

| | | | | |
|---|---|---|---|---|
| 3,817,708 A | * | 6/1974 | Vernon | B01J 19/0013 165/143 |
| 5,076,242 A | * | 12/1991 | Parker | F02M 55/007 123/468 |
| 5,251,603 A | * | 10/1993 | Watanabe | F02M 31/20 123/541 |
| 6,041,763 A | * | 3/2000 | Akyildiz | C10G 32/02 123/538 |
| 6,827,065 B2 | * | 12/2004 | Gottemoller | F02M 55/002 123/198 D |
| 7,438,122 B2 | * | 10/2008 | Hawranek | F28D 1/0233 165/157 |

* cited by examiner

*Primary Examiner* — Brian M O'Hara
*Assistant Examiner* — Assres H Woldemaryam
(74) *Attorney, Agent, or Firm* — Fish & Richardson P.C.

(57) ABSTRACT

One example of an aircraft fuel transfer chamber includes a chamber housing including a first sub-chamber defining a first inlet to be connected to an outer tube of a first aircraft fuel line assembly. The first sub-chamber receives fuel leaked into the outer tube of the first aircraft fuel line assembly from an inner tube of the first aircraft fuel line assembly. The chamber housing also includes a second sub-chamber connected to the first sub-chamber, the second sub-chamber defining a second inlet to be connected to an outer tube of a second aircraft fuel line assembly. The second sub-chamber receives fuel leaked into the outer tube of the second aircraft fuel line assembly from an inner tube of the second aircraft fuel line assembly. The chamber housing defines an outlet connected to the first inlet and the second inlet to transfer leaked fuel toward a drain of the aircraft.

20 Claims, 6 Drawing Sheets

FLUID TRANSFER CHAMBER FOR AIRCRAFT FLUID TRANSMISSION LINES

TECHNICAL FIELD

This disclosure relates to aircraft fluid transmission lines, e.g., transmission lines through which aircraft fuel or other aircraft fluid is transported.

BACKGROUND

An aircraft can include one or more fluid lines, e.g., tubing through which an aircraft fluid, e.g., fuel or other aircraft fluid, is transported. In some situations, a fluid line can be an inner tube used to transmit fluid. The inner tube can be surrounded by an outer tube (often referred to as a "sock") to contain fluid in the event that the inner tube leaks, and to direct the leaked fluid to a collection point or separate chamber where it can be safely discharged. In such situations, the outer tube serves as a secondary containment mechanism that directs leaked fluid away from a source of the leak. The outer tube prevents leaked fluid from leaking into the fuselage or onto aircraft components, as the fluid could pose a safety hazard or damage the components or both. In some cases, the placement of the fluid lines does not allow an outer tube to be connected to a collection point. For example, if a fluid line terminates at a bulkhead, the outer tube of the fluid line must also terminate at the bulkhead.

SUMMARY

This disclosure describes a fluid transfer chamber for aircraft fluid transmission lines.

Certain aspects of the subject matter described here can be implemented as an aircraft fuel transfer chamber to transfer aircraft fuel. The aircraft fuel transfer chamber includes a chamber housing. The chamber housing includes a first sub-chamber defining a first inlet to the chamber housing to be connected to an outer tube of a first aircraft fuel line assembly passing through a first portion of an aircraft, the first sub-chamber to receive fuel leaked into the outer tube of the first aircraft fuel line assembly from an inner tube of the first aircraft fuel line assembly. The chamber housing also includes a second sub-chamber connected to the first sub-chamber, the second sub-chamber defining a second inlet to the chamber housing to be connected to an outer tube of a second aircraft fuel line assembly passing through a second portion of the aircraft, the second sub-chamber to receive fuel leaked into the outer tube of the second aircraft fuel line assembly from an inner tube of the second aircraft fuel line assembly, the chamber housing defining an outlet connected to the first inlet and the second inlet to transfer leaked fuel from the first portion and the second portion toward a drain of the aircraft.

This, and other aspects, can include one or more of the following features. The first inlet and the second inlet can be formed in the upper surface of the chamber housing. The chamber housing can include a ceiling and a floor. The ceiling and the floor can define a passage through which the leaked fuel flows from the first sub-chamber to the second sub-chamber. The floor can be flat. The first aircraft fuel line assembly can include an interface member between the outer tube and the inner tube of the first aircraft fuel line assembly, and the floor can include a recessed step to receive the interface member. At least one of the first inlet or the second inlet can have a circular cross-section. The first inlet and the second inlet can have respective circular cross-sections, and a diameter of the first inlet can be substantially equal to a diameter of the second inlet. The chamber housing can include a first flange surrounding the first inlet, the first flange to connect the outer tube of the first aircraft fuel line assembly to the first inlet. The first flange can be configured to connect to the outer tube of the first aircraft fuel line using a zip tie. The chamber housing can include a third sub-chamber defining a third inlet to the chamber housing to be connected to an outer tube of a third aircraft fuel line assembly passing through a third portion of the aircraft, the third sub-chamber to receive fuel leaked into the outer tube of the third aircraft fuel line assembly from an inner tube of the third aircraft fuel line assembly, the outlet connected to the third inlet to transfer leaked fuel from the third portion toward the drain of the aircraft.

Certain aspects of the subject matter described here can be implemented as an aircraft fuel transport system. The aircraft fuel transport system includes a first aircraft fuel line assembly. The first aircraft fuel line assembly includes a first inner tube to transfer fuel through a first portion of an aircraft and a first outer tube positioned outside the first inner tube to transfer fuel that has leaked out of the first inner tube into the first outer tube. The aircraft fuel transport system also includes a second aircraft fuel line assembly. The second aircraft fuel line assembly includes a second inner tube to transfer fuel through a second portion of the aircraft and a second outer tube positioned outside the second inner tube to transfer fuel that has leaked out of the second inner tube into the second outer tube. The aircraft fuel transport system also includes a chamber housing. The chamber housing includes a first sub-chamber defining a first inlet to the chamber housing to be connected to the first outer tube of the first aircraft fuel line assembly, the first sub-chamber to receive fuel leaked into the first outer tube. The chamber housing also includes a second sub-chamber connected to the first sub-chamber, the second sub-chamber defining a second inlet to the chamber housing to be connected to the second outer tube, the second sub-chamber to receive fuel leaked into the second outer tube, the chamber housing defining an outlet connected to the first inlet and the second inlet to transfer leaked fuel from the first portion and the second portion toward a drain of the aircraft.

This, and other aspects, can include one or more of the following features. The first inlet and the second inlet can be formed in the upper surface of the chamber housing. The chamber housing can include a ceiling and a floor. The ceiling and the floor can define a passage through which the leaked fuel flows from the first sub-chamber to the second sub-chamber. The floor can be flat, the first aircraft fuel line assembly can include an interface member between the outer tube and the inner tube of the first aircraft fuel line assembly, and the floor can include a recessed step to receive the interface member. The chamber housing can include a third sub-chamber defining a third inlet to the chamber housing to be connected to an outer tube of a third aircraft fuel line assembly passing through a third portion of the aircraft, the third sub-chamber to receive fuel leaked into the outer tube of the third aircraft fuel line assembly from an inner tube of the third aircraft fuel line assembly, the outlet connected to the third inlet to transfer leaked fuel from the third portion toward the drain of the aircraft. The first portion of the aircraft or the second portion of the aircraft can be an APU. The first portion of the aircraft or the second portion of the aircraft can be an engine.

Certain aspects of the subject matter described here can be implemented as an aircraft fuel transfer chamber. The aircraft fuel transfer chamber includes a chamber housing. The chamber housing includes a first inlet to the chamber housing to be connected to an outer tube of a first aircraft fuel line assembly passing through a first portion of an aircraft, the chamber housing to receive fuel leaked into the outer tube of the first aircraft fuel line assembly from an inner tube of the first aircraft fuel line assembly through the first inlet. The chamber housing also includes a second inlet to the chamber housing to be connected to an outer tube of a second aircraft fuel line assembly passing through a second portion of the aircraft, the chamber housing to receive fuel leaked into the outer tube of the second aircraft fuel line assembly from an inner tube of the second aircraft fuel line assembly, the chamber housing defining an outlet connected to the first inlet and the second inlet to transfer leaked fuel from the first portion and the second portion toward a drain of the aircraft.

Certain aspects of the subject matter described here can be implemented as an aircraft fuel transfer chamber to transfer aircraft fuel. The chamber can include a housing means, which can include a first means for defining a first inlet to the housing means to be connected to an outer tube of a first aircraft fuel line assembly passing through a first portion of an aircraft, the means for defining the first inlet to receive fuel leaked into the outer tube of the first aircraft fuel line assembly from an inner tube of the first aircraft fuel line assembly. The chamber can include a second means connected to the first means. The second means can define a second inlet to the housing means to be connected to an outer tube of a second aircraft fuel line assembly passing through a second portion of the aircraft, the means for defining the second inlet to receive fuel leaked into the outer tube of the second aircraft fuel line assembly from an inner tube of the second aircraft fuel line assembly. The chamber can include a means for defining an outlet connected to the first inlet and the second inlet to transfer leaked fuel from the first portion and the second portion toward a drain of the aircraft.

Certain aspects of the subject matter described here can be implemented as an aircraft fuel transport system. The system can include a first aircraft fuel line assembly means for transferring fuel which can include a first inner tube to transfer fuel through a first portion of an aircraft and a first outer tube positioned outside the first inner tube to transfer fuel that has leaked out of the first inner tube into the first outer tube. The aircraft fuel transport system can include a second aircraft fuel line assembly means. The second aircraft fuel line assembly means can include a second inner tube to transfer fuel through a second portion of the aircraft and a second outer tube positioned outside the second inner tube to transfer fuel that has leaked out of the second inner tube into the second outer tube. The system can include a housing means, which can include a first means for defining a first inlet to the housing means to be connected to the first outer tube of the first aircraft fuel line assembly, the means for defining the first inlet to receive fuel leaked into the first outer tube. The housing means can include a second means connected to the first means. The second means can define a second inlet to the housing means to be connected to the second outer tube, the means for defining the second inlet to receive fuel leaked into the second outer tube. The housing means can define an outlet connected to the first inlet and the second inlet to transfer leaked fuel from the first portion and the second portion toward a drain of the aircraft.

Certain aspects of the subject matter described here can be implemented as an aircraft fuel transfer chamber. The chamber can include a housing means, which can include a first inlet to the housing means to be connected to an outer tube of a first aircraft fuel line assembly passing through a first portion of an aircraft, the housing means to receive fuel leaked into the outer tube of the first aircraft fuel line assembly from an inner tube of the first aircraft fuel line assembly through the first inlet. The housing means can include a second inlet to the housing means to be connected to an outer tube of a second aircraft fuel line assembly passing through a second portion of the aircraft, the housing means to receive fuel leaked into the outer tube of the second aircraft fuel line assembly from an inner tube of the second aircraft fuel line assembly. The housing means can define an outlet connected to the first inlet and the second inlet to transfer leaked fuel from the first portion and the second portion toward a drain of the aircraft.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
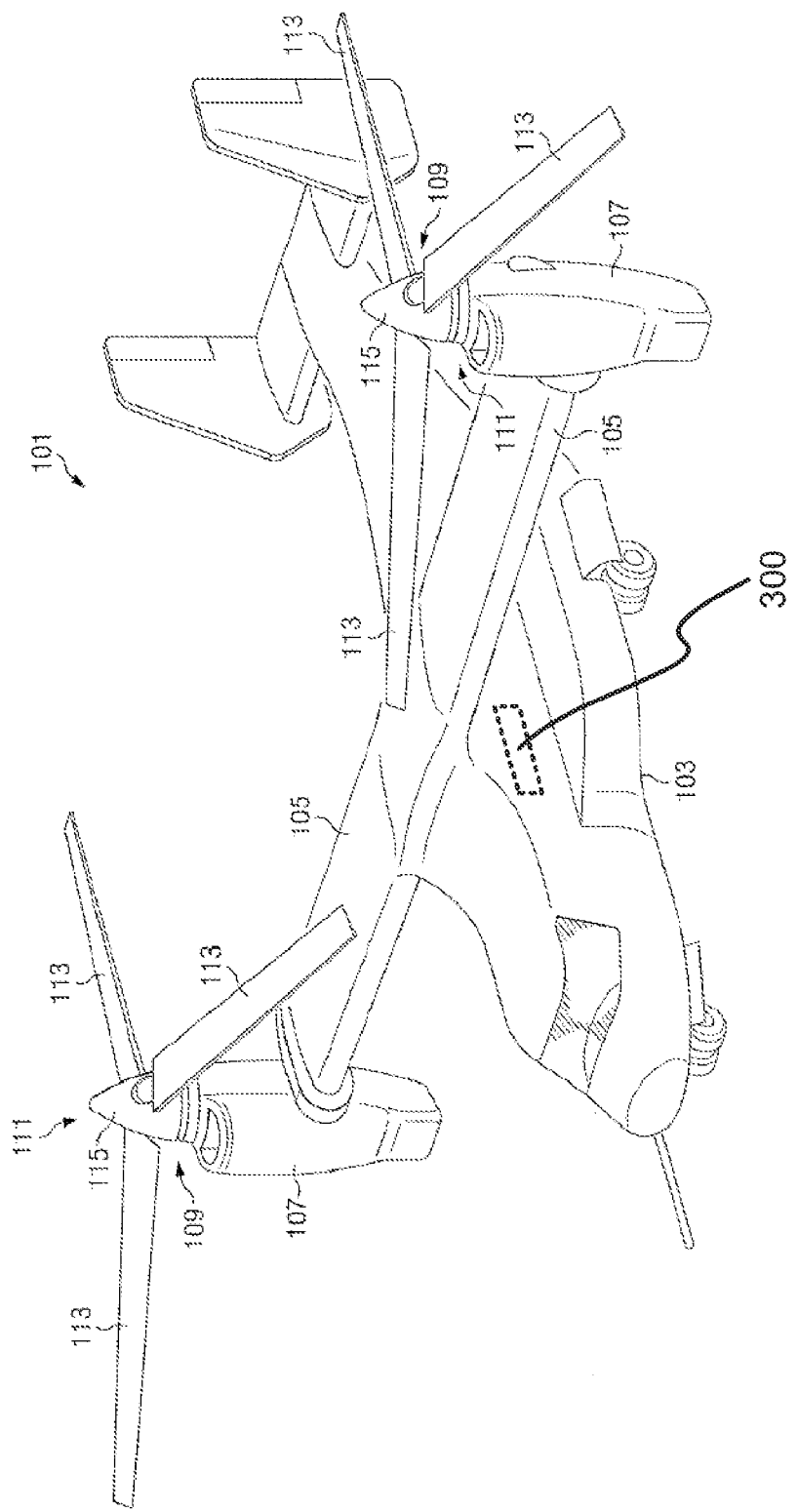
FIG. 1 is a schematic diagram showing an example of a tiltrotor aircraft.

This specification describes a fluid transfer chamber for aircraft fluid transmission lines. Some aircraft fluids (e.g., fuel, hydraulic fluid or other aircraft fluid) are transferred between components and systems through fluid transmission lines. In some cases, the transmission lines include an inner tube through which the fluid flows and an outer tube surrounding the inner tube that acts as a secondary containment (often referred to as a "sock"). In the event that the inner tube leaks fluid, the outer tube captures the fluid and thus prevents the leaked fluid from spilling onto and damaging other components or posing a safety hazard. The outer tube directs the leaked fluid to a collection point. An aircraft can have multiple fluid transmission lines, each having an individual outer tube to contain leaks. However, in some cases the outer tube of fluid transmission line cannot be coupled to a collection point. For example, if the inner tube of a transmission line terminates into a bulkhead connector (such as on a roof beam), the outer tube of the transmission line also terminates at the bulkhead.

This specification describes a fluid transfer chamber that fluidly connects the outer tubes of two aircraft transmission lines to allow leaked fluid from both transmission lines to flow to a single collection point. In some implementations, the fluid transfer chamber includes a chamber housing with two sub-chambers. Each sub-chamber is shaped as an inlet to couple to an outer tube of a transmission line. The two sub-chambers are connected by a passage within the chamber housing so fluids can flow from one sub-chamber to another sub-chamber. The chamber housing also includes an outlet that allows the leaked fluids to drain from the sub-chambers to a collection point or other portions, e.g., other fluid transfer chambers. The fluid transfer chamber can be mounted to any surface in an aircraft, such as on a floor within the fuselage, on a roof beam, or any other surface where fluid transmission lines route and use a collection chamber for safe discharge of the fluid. The fluid transfer chamber can be mounted by a suitable technique such as bonding with glue or sealant or a technique such as fastening with screws or another technique. The fluid transfer chamber can be any suitable material such as a plastic which is compatible with the aircraft fluid(s).

The fluid transfer chamber can be used in applications for transmission lines in an aircraft or in aircraft applications where a fume-tight or leak-proof enclosure is required. For example, the fluid transfer chamber could be used in an aircraft fuel transmission line between a fuel tank and an engine or between a fuel tank and an APU. The fluid transfer chamber can enable leaked fluid to be collected that would otherwise be uncollected or difficult to collect. Use of the fluid transfer chamber can also reduce weight compared to a system such as a sheet-metal fume tight enclosure.

In example implementations described here, the fluid transfer chamber is implemented in aircraft fuel transmission lines. However, the fluid transfer chamber can also be used in fluid transmission lines to transport fuel and/or other fluids in other systems in which fluid is transported, e.g., automotive systems (e.g. automobiles, ATVs, motorcycles, etc.), fixed-wing aircraft, submersible systems, marine systems (e.g. personal watercraft, boats, etc.), agricultural systems (e.g. tractors, etc.), power equipment (e.g. generators, lawn mowers, pressure sprayers, etc.), systems that include gasoline engines, or other systems.

FIG. 1 is a schematic diagram of an example tiltrotor aircraft 101. Aircraft 101 includes a fuselage 103 with attached wings 105. Nacelles 107 are carried at the outboard ends of wings 105 and are rotatable between the helicopter-mode position shown and a forward-facing airplane-mode position (not shown). Nacelles 107 carry engines and transmissions 109 for powering rotor systems 111 in rotation. An engine may be an internal combustion engine, an electrical power source and associated motor, or any other suitable means for powering rotor system 111. Each rotor system 111 is illustrated as having three blades 113. Spinning covers 115 and nacelles 107 substantially enclose transmission 109, obscuring transmission 109 from view in FIG. 1. The tiltrotor aircraft 101 can include a fluid transfer chamber assembly 300. The fluid transfer chamber assembly 300 can be located within the fuselage 103.

Figure 2:
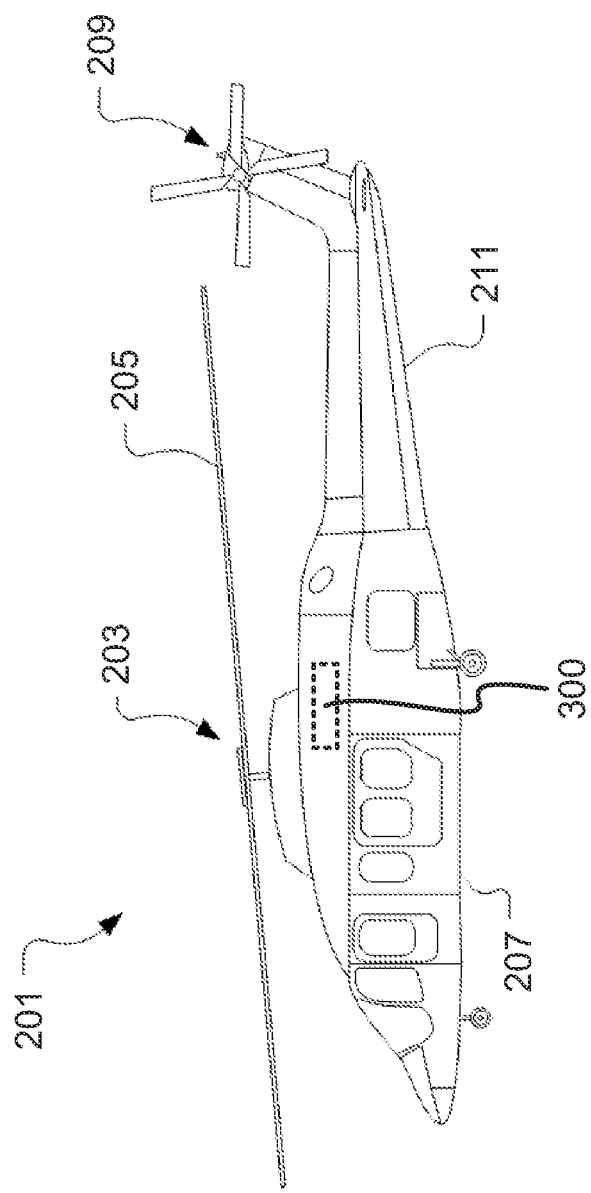
FIG. 2 is a schematic diagram showing an example of a rotorcraft.

FIG. 2 is a schematic diagram of an example rotorcraft 201. Rotorcraft 201 has a rotor system 203 with multiple rotor blades 205. The pitch of each rotor blade 205 can be manipulated in order to selectively control direction, thrust, and lift of rotorcraft 201. Rotorcraft 201 can further include a fuselage 207, anti-torque system 209, and an empennage 211. The rotorcraft 201 can also include a fluid transfer chamber assembly 300. The fluid transfer chamber assembly 300 can be implemented in one or more fluid transmission lines, e.g., fuel transmission lines, of the tiltrotor aircraft 101 or the rotorcraft 201 (or both), as described below.

Figure 3:
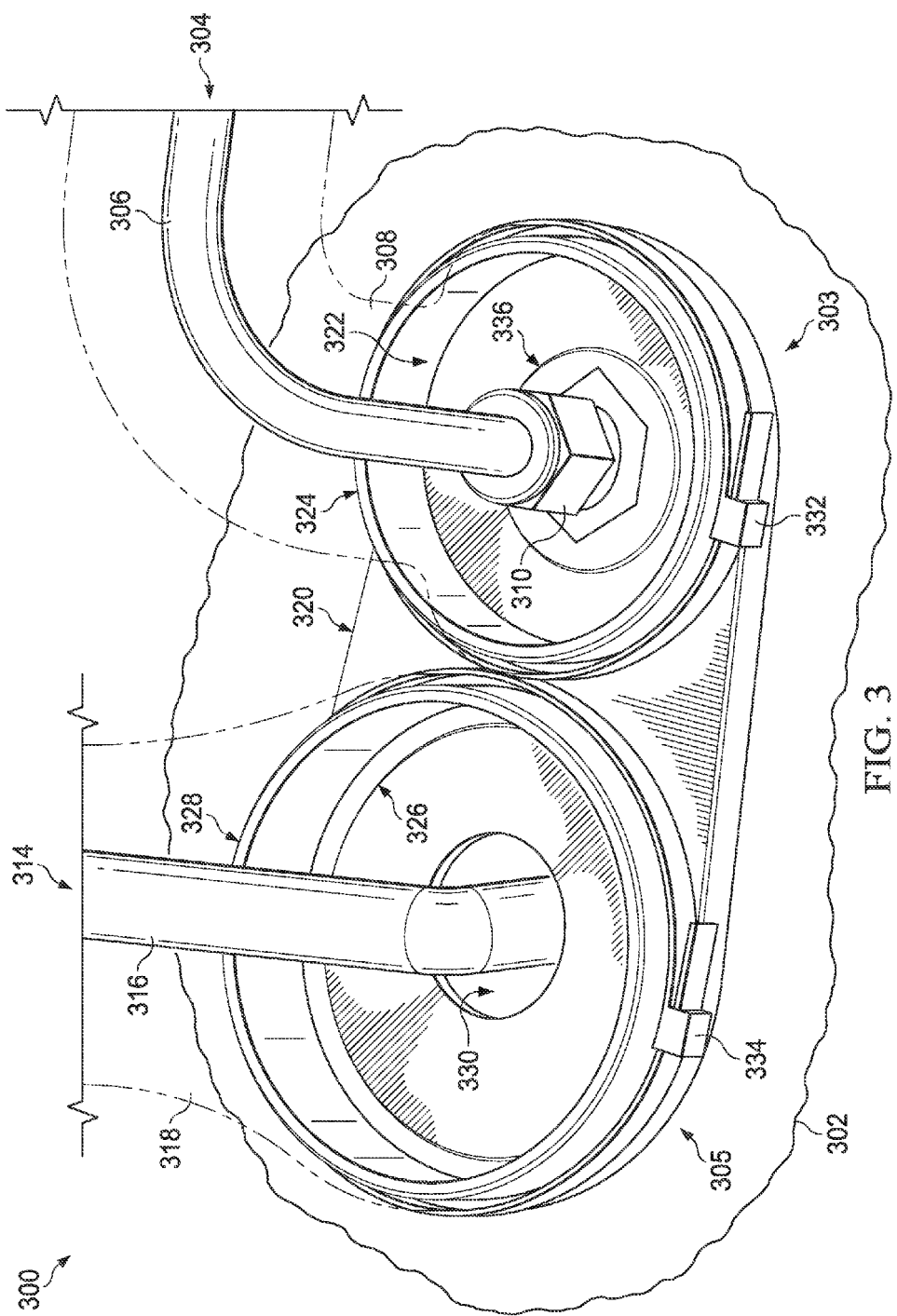
FIG. 3 is a schematic diagram showing a portion of an example fluid line assembly including a fluid transfer chamber.

FIG. 3 is an illustration of a portion of an example fluid transfer chamber assembly 300. In some implementations, the fluid transfer chamber assembly 300 can be included in an aircraft or rotorcraft (such as those shown in FIG. 1 and FIG. 2) as part of a fluid transfer system. For example, the fluid transfer chamber assembly 300 can include fuel transmission lines to transfer fuel from the fuel tank to the engine, or transfer fuel from the fuel tank to the APU, or transfer another fluid such as hydraulic fluid between two locations. The example fluid transfer chamber assembly 300 includes a first fluid line assembly 304 passing through a first portion 303 of the aircraft (e.g., the fuselage or bulkhead), a second fluid line assembly 314 passing through a second portion 305 of the aircraft (e.g., another bulkhead or another section of the fuselage or bulkhead), and a chamber housing 320. The fluid line assemblies 304, 314 are coupled to the chamber housing 320, and the chamber housing 320 is attached to a mounting surface 302 of the aircraft. The surface 302 can be a surface of an aircraft component such as the fuselage, bulkhead, beam, floor, or other component. The first fluid line assembly 304 includes an inner tube 306 and an outer tube 308. Likewise, the second fluid line assembly 314 includes an inner tube 316 and an outer tube 318. The outer tubes 308, 318 surround the inner tubes 306, 316 respectively as a secondary containment to contain and isolate any fluid that may leak from the inner tubes 306, 316.

The example chamber housing 320 includes two sub-chambers 322, 326, a passage 338 and an outlet 330. The first sub-chamber 322 defines a first inlet 324 to the chamber housing 320 that is fluidly coupled to the first outer tube 308. The second sub-chamber 326 defines a second inlet 328 to the chamber housing 320 that is fluidly coupled to the second outer tube 318. The first inlet 324 and the second inlet 328 are formed in the upper surface of the chamber housing 320. The first inlet 324 and/or the second inlet 328 can have a circular cross-section or another shape. The inlets 324, 328 can have substantially similar (e.g., equal) diameters or different diameters. Each inlet 324, 328 can include a surrounding flange 340, 342 to facilitate securing the respective outer tubes 308, 318 with clamps such as zip ties 332, 334. The flanges 340, 342 prevent the zip ties 332, 334 from sliding off of the chamber housing 320 and thus outer tubes 308, 318 are securely coupled to the inlets 324, 328, respectively. The outer tubes 308, 318 can be coupled to the inlets 324, 328 by any other suitable technique. For example, the inner tubes 308, 318 can be bonded to the chamber housing 320. As another example implementation, inlets 324, 38 can have a ribbed feature detail that prevents the outer tubes 308, 318 from sliding. The outer tubes 308, 318 can be a heat-shrink material that tightens around the inlets 324, 328 when cured. The outer tubes 308, 318 could have threaded features that mate to threads on the inlets 324, 328. As another example implementation, the outer tubes 308, 318 could mechanically snap over the inlets 324, 328. The inlets 324, 328 are fluidly coupled to the outer tubes 308, 318 such that the respective sub-chambers 322, 326 receive fluid leaked into the outer tubes 308, 318 from respective inner tubes 306, 316. In some implementations, multiple outer tubes, each surrounding a respective inner tube, converge into a single outer tube that is coupled to an inlet.

Figure 4:
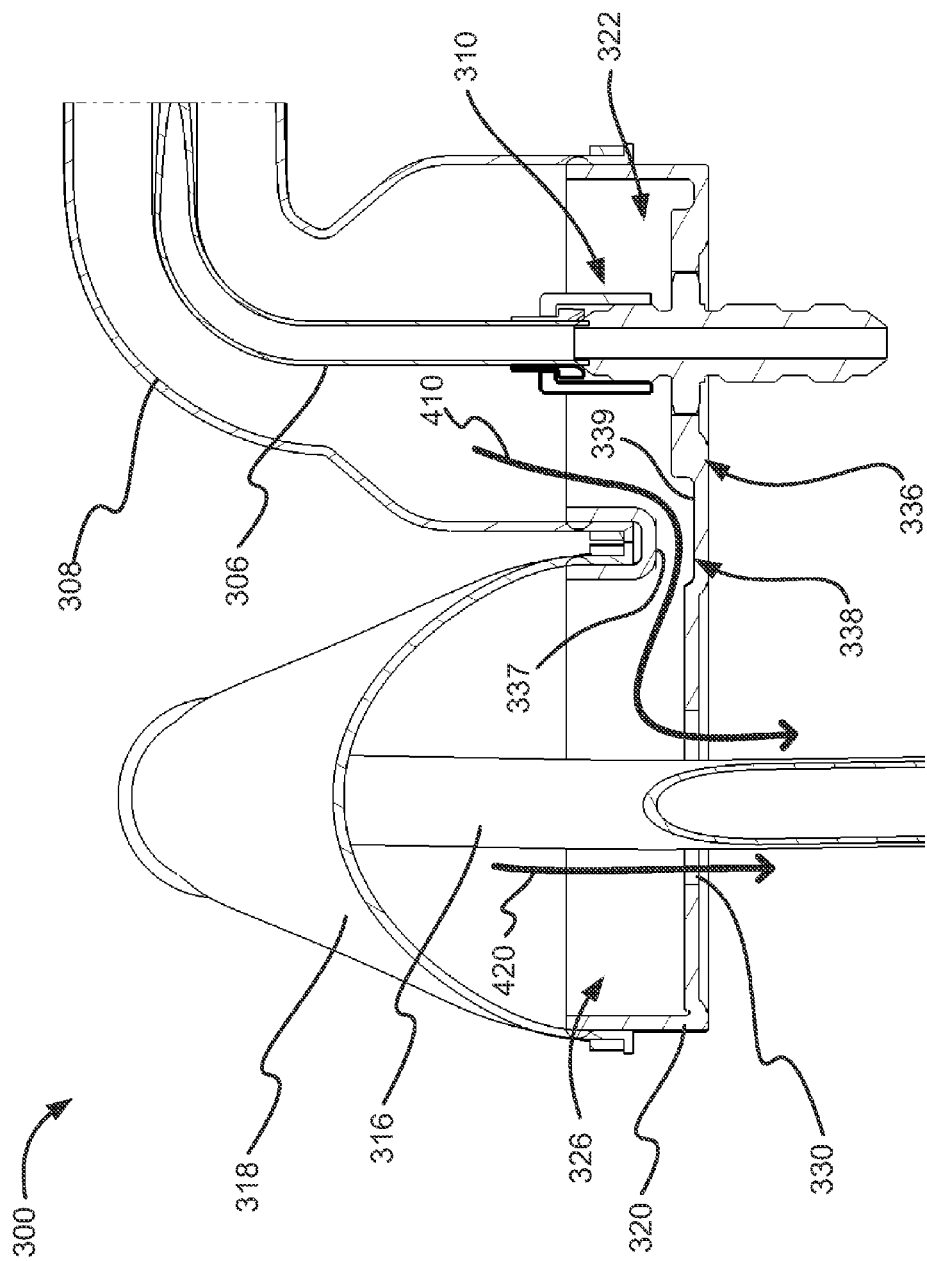
FIG. 4 is a schematic diagram showing a cross-section of an example fluid line assembly including a fluid transfer chamber.

FIG. 4 is a schematic illustration of a cross-section of example fluid transfer chamber assembly 300. The chamber housing 320 also includes a ceiling 337 and a floor 339 that define a passage 338. The outlet 330 is an opening through the floor 339 of the chamber housing 320 that allows the leaked fluids to drain from the sub-chambers 322, 326 to a collection point. The chamber housing 320 defines the outlet 330 in the floor 339, and the outlet 330 is fluidly connected to both sub-chambers 322, 326. The passage 338 fluidly connects the sub-chambers 322, 326, allowing leaked fluid to flow from the first sub-chamber 322 into the second sub-chamber 326 and out of the outlet 330 in the floor 339. The passage 338 extends between sub-chamber 322 and sub-chamber 326. Fluid leaked from inner tube 306 is contained by outer tube 308 and collected into sub-chamber 322. The leaked fluid in sub-chamber 322 can flow through passage 338 into sub-chamber 326 and into outlet 330, as indicated by arrow 410. Fluid leaked from inner tube 316 is contained by outer tube 318 and collected into sub-chamber 326, where it can flow into outlet 330, as indicated by arrow 420. In this manner, a single outlet 330 can collect leaked fluid from the two fluid line assemblies 304, 314.

In the example fluid transfer chamber assembly 300, the inner tube 306 is fluidly coupled to interface member 310. The interface member 310 is a member that allows the fluid in inner tube 306 to be transmitted through the surface 302 or other aircraft component such as a bulkhead or fuselage. For example, a separate tube (not shown) can be coupled to the end of the interface member 310 opposite the inner tube 306. The interface member 310 can be a connector such as a bulkhead fitting or other connector.

In the example fluid transfer chamber assembly 300, the floor 339 of the chamber housing 320 also includes a recessed step 336 to receive the interface member 310. The recessed step 336 can have an opening through the floor 339 of chamber housing 320 that is shaped to accommodate the interface member 310. In this manner, the recessed step 336 provides anti-torque when the inner tube 306 is attached to the interface member 310. For example, the recessed step 336 can have a hexagonal opening to accommodate a hexagonal portion of the interface member (see FIG. 3). The recessed step 336 can have any suitable opening shape to receive an interface member 310 (e.g., square, irregular, or another shape). As such, shaping the opening to receive an interface member can reduce the weight or size of the fluid transfer chamber assembly since extra components are not needed to attach the interface member to the fluid transfer chamber assembly. The floor 339 of the chamber housing 320 can be shaped to conform to the mounting surface 302. For example, the floor 339 of the chamber housing 320 could have a recess that is located opposite a protrusion on the mounting surface 302. In some cases, a recess in the floor 339 that is separated from the interface member 310 acts as an additional anti-torque.

Figure 5:
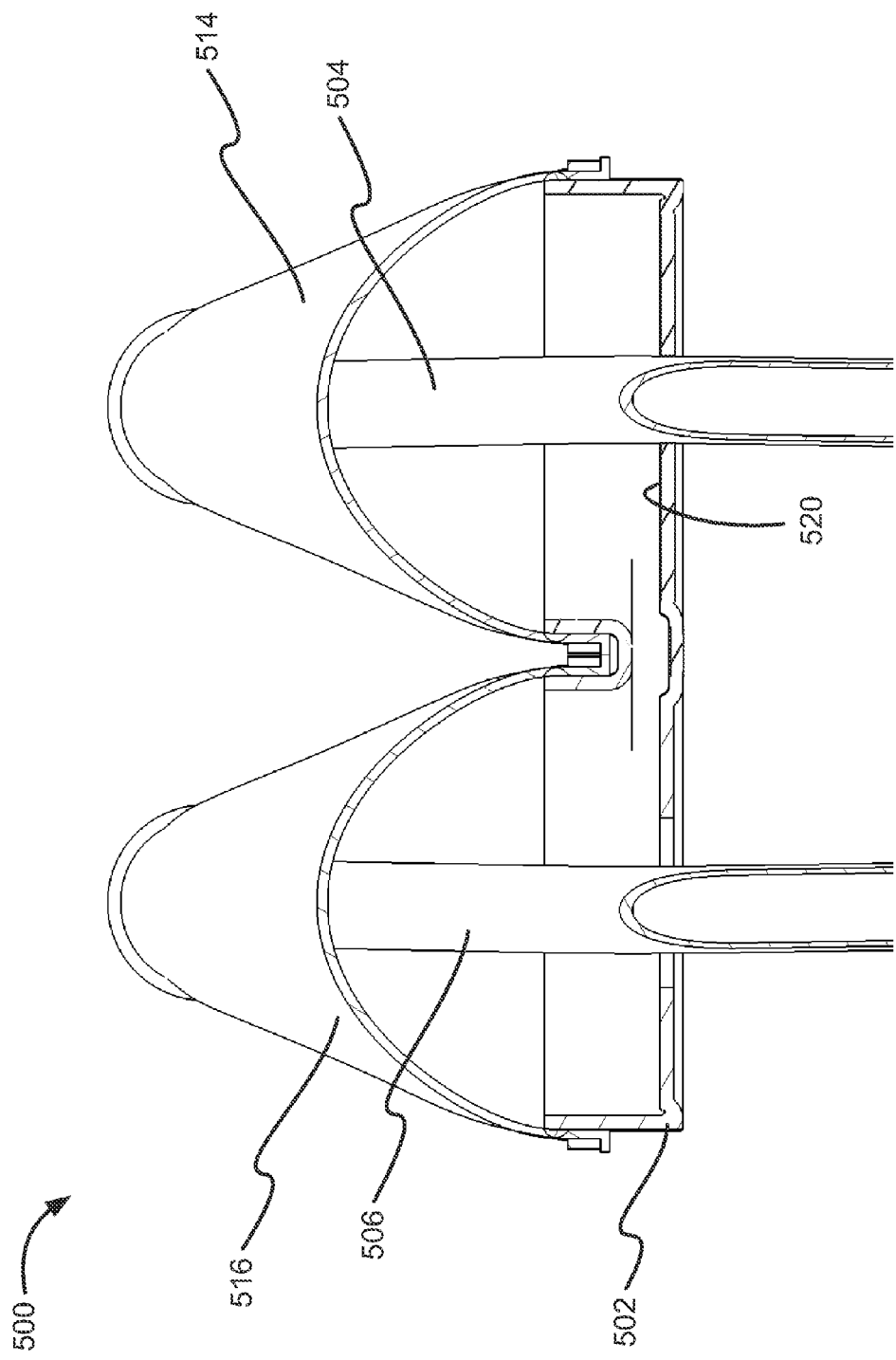
FIG. 5 is a schematic diagram of an example of a fluid transfer chamber with a flat floor.

FIG. 5 is a schematic illustration of a cross-section of example fluid transfer chamber assembly 500. In some implementations, the example fluid transfer chamber assembly 500 can have the same features as or different features from the example fluid transfer chamber assembly 300. For example, fluid transfer chamber assembly 500 includes a chamber housing 502 and two inner tubes 504, 506 surrounded by two outer tubes 514, 516 respectively. The floor 520 of chamber housing 502 is substantially flat, without a recessed step such as recessed step 336.

Figure 6:
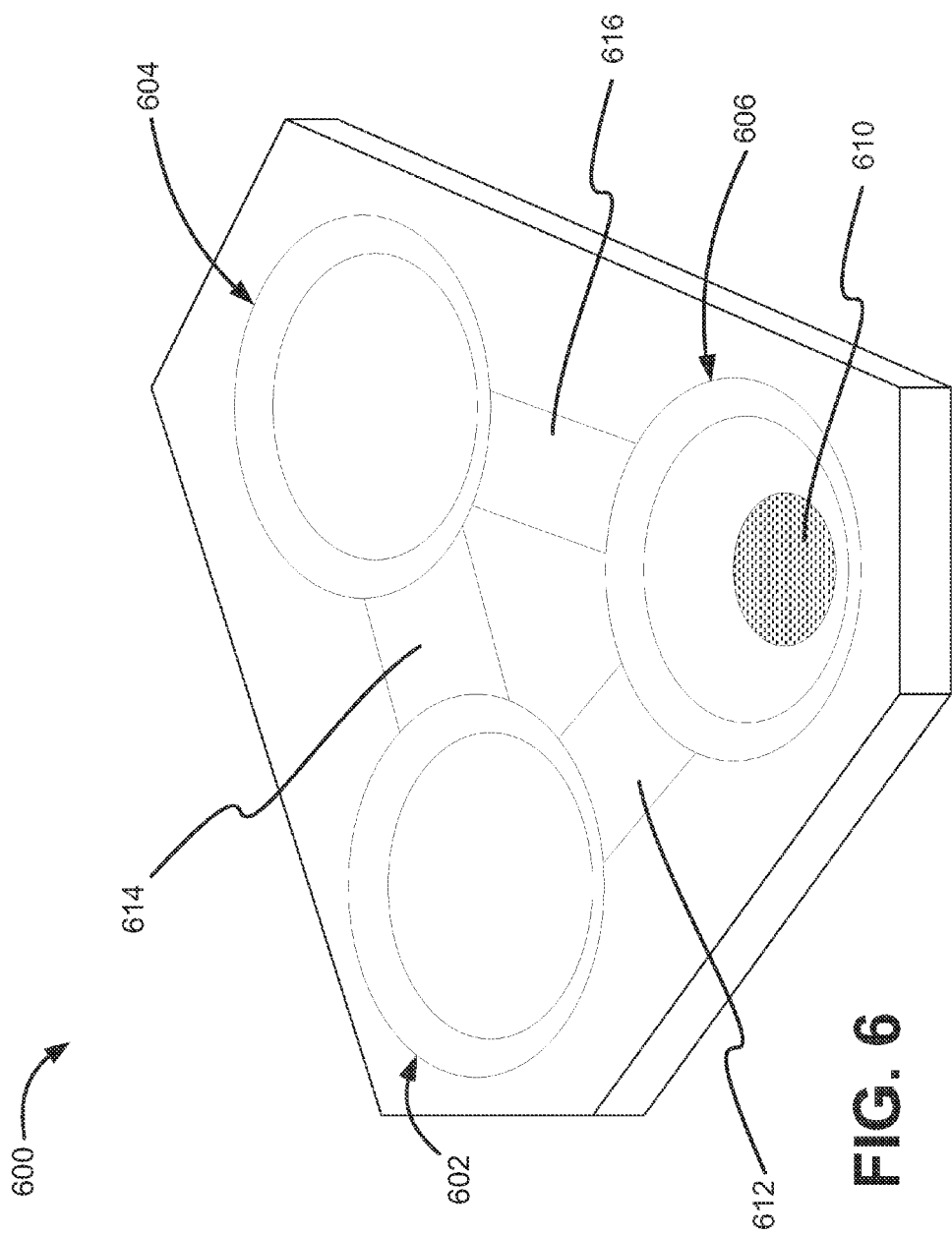
FIG. 6 is a schematic diagram of an example of a fluid transfer chamber with three inlets.

FIG. 6 is a schematic illustration of example chamber housing 600. The example fluid chamber housing 600 is substantially similar to fluid chamber housing 320. Chamber housing 600 includes three inlets 602, 604, 606 and an outlet 610. The three inlets 602, 604, 606 and the outlet 610 are fluidly connected by three passages 612, 614, 616. The three inlets 602, 604, 606 can each be fluidly coupled to outer tubes (not shown). Chamber housing 600 can receive leaked fluids from the three inlets 602, 604, 606 and transport the fluids to outlet 610. Chamber housings 320 and 600 have two and three inlets, respectively, but any number of fluidly connected inlets can be included in a chamber housing. In this manner, leaked fluids from any number of fluid transmission lines can be transported to a single outlet for collection. In some implementations, the chamber housing 600 has multiple recessed steps to accommodate multiple interface members. In some implementations, portions of the floor of the chamber housing 600 are substantially flat.

A number of implementations have been described. Nevertheless, it will be understood that various modifications may be made without departing from the spirit and scope of the disclosure.

What is claimed is:

1. An aircraft fuel transfer chamber to transfer aircraft fuel, the chamber comprising:
a chamber housing including:
a first sub-chamber defining a first inlet to the chamber housing to be connected to an outer tube of a first aircraft fuel line assembly passing through a first portion of an aircraft, the first sub-chamber to receive fuel leaked into the outer tube of the first aircraft fuel line assembly from an inner tube of the first aircraft fuel line assembly; and
a second sub-chamber connected to the first sub-chamber, the second sub-chamber defining a second inlet to the chamber housing to be connected to an outer tube of a second aircraft fuel line assembly passing through a second portion of the aircraft, the second sub-chamber to receive fuel leaked into the outer tube of the second aircraft fuel line assembly from an inner tube of the second aircraft fuel line assembly, the chamber housing defining an outlet connected to the first inlet and the second inlet to transfer leaked fuel from the first portion and the second portion toward a drain of the aircraft.

2. The aircraft fuel transfer chamber of claim 1, wherein the first inlet and the second inlet are formed in the upper surface of the chamber housing.

3. The aircraft fuel transfer chamber of claim 1, wherein the chamber housing includes a ceiling and a floor.

4. The aircraft fuel transfer chamber of claim 3, wherein the ceiling and the floor define a passage through which the leaked fuel flows from the first sub-chamber to the second sub-chamber.

5. The aircraft fuel transfer chamber of claim 3, wherein the floor is flat.

6. The aircraft fuel transfer chamber of claim 5, wherein the first aircraft fuel line assembly includes an interface member between the outer tube and the inner tube of the first aircraft fuel line assembly, and wherein the floor comprises a recessed step to receive the interface member.

7. The aircraft fuel transfer chamber of claim 1, wherein at least one of the first inlet or the second inlet has a circular cross-section.

8. The aircraft fuel transfer chamber of claim 1, wherein the first inlet and the second inlet have respective circular cross-sections, and wherein a diameter of the first inlet is substantially equal to a diameter of the second inlet.

9. The aircraft fuel transfer chamber of claim 1, wherein the chamber housing further comprises a first flange surrounding the first inlet, the first flange to connect the outer tube of the first aircraft fuel line assembly to the first inlet.

10. The aircraft fuel transfer chamber of claim 9, wherein the first flange is configured to connect to the outer tube of the first aircraft fuel line using a zip tie.

11. The aircraft fuel transfer chamber of claim 1, further comprising a third sub-chamber defining a third inlet to the chamber housing to be connected to an outer tube of a third aircraft fuel line assembly passing through a third portion of the aircraft, the third sub-chamber to receive fuel leaked into the outer tube of the third aircraft fuel line assembly from an inner tube of the third aircraft fuel line assembly, the outlet connected to the third inlet to transfer leaked fuel from the third portion toward the drain of the aircraft.

12. An aircraft fuel transport system comprising:
a first aircraft fuel line assembly comprising:
- a first inner tube to transfer fuel through a first portion of an aircraft, and
- a first outer tube positioned outside the first inner tube to transfer fuel that has leaked out of the first inner tube into the first outer tube;

a second aircraft fuel line assembly comprising:
- a second inner tube to transfer fuel through a second portion of the aircraft, and
- a second outer tube positioned outside the second inner tube to transfer fuel that has leaked out of the second inner tube into the second outer tube; and a chamber housing including:
- a first sub-chamber defining a first inlet to the chamber housing to be connected to the first outer tube of the first aircraft fuel line assembly, the first sub-chamber to receive fuel leaked into the first outer tube, and
- a second sub-chamber connected to the first sub-chamber, the second sub-chamber defining a second inlet to the chamber housing to be connected to the second outer tube, the second sub-chamber to receive fuel leaked into the second outer tube, the chamber housing defining an outlet connected to the first inlet and the second inlet to transfer leaked fuel from the first portion and the second portion toward a drain of the aircraft.

13. The aircraft fuel transport system of claim 12, wherein the first inlet and the second inlet are formed in the upper surface of the chamber housing.

14. The aircraft fuel transport system of claim 12, wherein the chamber housing includes a ceiling and a floor.

15. The aircraft fuel transport system of claim 14, wherein the ceiling and the floor define a passage through which the leaked fuel flows from the first sub-chamber to the second sub-chamber.

16. The aircraft fuel transport system of claim 14, wherein the floor is flat and the first aircraft fuel line assembly includes an interface member between the outer tube and the inner tube of the first aircraft fuel line assembly, and wherein the floor comprises a recessed step to receive the interface member.

17. The aircraft fuel transport system of claim 12, further comprising a third sub-chamber defining a third inlet to the chamber housing to be connected to an outer tube of a third aircraft fuel line assembly passing through a third portion of the aircraft, the third sub-chamber to receive fuel leaked into the outer tube of the third aircraft fuel line assembly from an inner tube of the third aircraft fuel line assembly, the outlet connected to the third inlet to transfer leaked fuel from the third portion toward the drain of the aircraft.

18. The aircraft fuel transport system of claim 12, wherein the first portion of the aircraft or the second portion of the aircraft is an Auxiliary Power Unit (APU).

19. The aircraft fuel transport system of claim 12, wherein the first portion of the aircraft or the second portion of the aircraft is an engine.

20. An aircraft fuel transfer chamber, the chamber comprising:
a chamber housing defining:
- a first inlet to the chamber housing to be connected to an outer tube of a first aircraft fuel line assembly passing through a first portion of an aircraft, the chamber housing to receive fuel leaked into the outer tube of the first aircraft fuel line assembly from an inner tube of the first aircraft fuel line assembly through the first inlet; and
- a second inlet to the chamber housing to be connected to an outer tube of a second aircraft fuel line assembly passing through a second portion of the aircraft, the chamber housing to receive fuel leaked into the outer tube of the second aircraft fuel line assembly from an inner tube of the second aircraft fuel line assembly, the chamber housing defining an outlet connected to the first inlet and the second inlet to transfer leaked fuel from the first portion and the second portion toward a drain of the aircraft.

* * * * *